(12) United States Patent
Nielsen et al.

(10) Patent No.: US 9,034,534 B2
(45) Date of Patent: May 19, 2015

(54) COMPRESSION CASING FOR A FUEL CELL STACK AND A METHOD FOR MANUFACTURING A COMPRESSION CASING FOR A FUEL CELL STACK

(75) Inventors: Martin Refslund Nielsen, Copenhagen Ø (DK); Niels H. B. Erikstrup, Frederiksberg C (DK)

(73) Assignee: Haldor Topsoe A/S, Lyngby (DK)

(*) Notice: Subject to any disclaimer, the term of this patent is extended or adjusted under 35 U.S.C. 154(b) by 92 days.

(21) Appl. No.: 13/255,791

(22) PCT Filed: Mar. 11, 2010

(86) PCT No.: PCT/EP2010/001528
§ 371 (c)(1),
(2), (4) Date: Sep. 9, 2011

(87) PCT Pub. No.: WO2010/102815
PCT Pub. Date: Sep. 16, 2010

(65) Prior Publication Data
US 2012/0028159 A1 Feb. 2, 2012

(30) Foreign Application Priority Data

Mar. 13, 2009 (DK) .............................. 2009 00365

(51) Int. Cl.
*H01M 8/24* (2006.01)
*C25B 9/18* (2006.01)
*H01M 8/12* (2006.01)

(52) U.S. Cl.
CPC ................ *H01M 8/2475* (2013.01); *C25B 9/18* (2013.01); *H01M 8/2435* (2013.01); *H01M 8/248* (2013.01); *H01M 2008/1293* (2013.01); *Y02E 60/366* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| 7,779,856 B2 * | 8/2010 | Adams et al. ................. 137/210 |
| 2004/0151968 A1 | 8/2004 | Warrier et al. |
| 2008/0014492 A1 | 1/2008 | Nielsen et al. |
| 2008/0182152 A1 | 7/2008 | Erikstrup |

FOREIGN PATENT DOCUMENTS

| DE | 196 45 111 A1 | 5/1998 |
| DE | 102 50 345 A1 | 5/2004 |
| WO | WO 2006/012844 A1 | 2/2006 |
| WO | WO 2008/003286 A1 | 1/2008 |
| WO | WO 2008/089977 A1 | 7/2008 |

* cited by examiner

*Primary Examiner* — Sarah A Slifka
(74) *Attorney, Agent, or Firm* — Dickstein Shapiro LLP (57) ABSTRACT

A fuel cell or electrolysis cell stack has force distribution members with one planar and one convex shape applied to at least its top and bottom face and in one embodiment further to two of its side faces. A compressed mat and further a rigid fixing collar surrounds the stack and force distribution members, whereby the stack is submitted to a compression force on at least the top and bottom face and potentially also to two side faces. The assembly is substantially gas tight in an axial direction of the primarily oval or circular shape and can be fitted with gas tight end plates to form robust gas inlet and outlet manifolds.

16 Claims, 8 Drawing Sheets

COMPRESSION CASING FOR A FUEL CELL STACK AND A METHOD FOR MANUFACTURING A COMPRESSION CASING FOR A FUEL CELL STACK

The invention relates to compression of cell stacks, more specifically to a compression casing for fuel cell stacks or electrolysis cell stacks and the manufacture of such compression casings in particular for Solid Oxide Fuel Cell (SOFC) stacks or Solid Oxide Electrolysis Cell stacks (SOEC).

In the following the invention will be explained in relation to SOFC stacks. The compression casing according to the invention can, however, also be used for other types of fuel cells such as Polymer Electrolyte Fuel cells (PEM) or Direct Methanol Fuel Cells (DMFC). Further, the invention can also be used for electrolysis cells such as Solid Oxide Electrolysis Cells and such cell stacks.

The electro-chemical reactions and the function of a fuel cell or an electrolysis cell is not the essence of the present invention, thus this will not be explained in detail, but considered known for a person skilled in the art.

To increase the voltage produced by the SOFC, several cell units are assembled to form a stack and are linked together by interconnects. These layers of the stack are sealed together with a gas tight and temperature resistant seal such as glass along some or all edges. The interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. The current conduction between the interconnect and its neighbouring electrodes is enabled via a plurality of contact points throughout the area of the interconnect. The contact points can be formed as protrusions on both sides of the interconnect. The efficiency of the fuel cell stack is dependant of good contact in each of these points, and therefore it is crucial that a suitable compression force is applied to the fuel cell stack. This compression force must be large enough and evenly distributed throughout the area of the fuel cell to ensure electrical contact, but not so large that it damages the electrolyte, the electrodes, the interconnect or impedes the gas flow over the fuel cell. The compression of the fuel cell is also vital for the seal between the layers of the stack to keep the stack gas tight.

A solution to this problem has been proposed in WO 2008089977 describing how the fuel cell stack has thermally insulating end blocks having one rectangular planar side facing the stack and an opposing side of convex shape. Springs tighten a flexible sheet against the convex shaped face of the end blocks, whereby the spring force is evenly distributed over the stack end areas.

In DE 10250345 a housing surrounding a SOFC is provided and a compressible mat between the stack and the housing provides a compression force to the cells both radially and axially.

WO 2006012844 describes how a stack is tensioned via springs that forces for instance hemisphereically shaped pressure distributing elements against thermally insulating elements which then presses further onto the stack.

In WO 2008003286 a stack is compressed by thermally insulating elements, which are pressed against the stack by an elastic sleeve. The sleeve can for instance be made of silicone or natural caoutchouc.

Yet another stack compression principle is shown in DE 19645111.

In spite of the presented known solutions to the compression problem of a fuel cell stack, all of them have some of the inherent problems:

The more components involved in the compression system the more expensive it is to produce and the higher the material costs. Further the risk of malfunction generally increases with increasing number of components.

The reliance of metal springs to compress the stack increases costs and especially when subjected to heat, metal springs tend to creep and therefore over time changes the spring characteristic and therefore the compressive force.

The solution using caoutchouc as pressure generator can require a further static housing, for instance in metal to enable the mechanical and the process connection to surrounding systems, and to protect the compression assembly.

Solutions without convex force distribution members have the risk of uneven pressure throughout the area of the stack and hence risk of insufficient electrical contact and delamination of the fuel cell stack components.

Compression solutions which are not gas tight will require extra components for gas distribution, manifolds, which are expensive and delicate to attach and complicates the fuel cell system especially when several stacks must be connected in series and/or parallel.

Solutions without a strong and tight outer surface are vulnerable to damage in handling, service and operation.

It is an object of the present invention to solve the mentioned problems by providing a new compression casing assembly for one or more cell stacks.

More specifically, it is an object of the invention to provide a compression casing assembly which omits the necessity for metal springs to compress a cell stack.

An object of the invention is also to provide a compression casing assembly which forms a pressure resistant container able to withstand the pressures existing in for instance turbine systems.

It is a further object of the invention to provide a compression casing assembly which can tolerate high surrounding temperatures.

It is further an object of the invention to provide a compression casing assembly which provides for a substantially gas tight enclosure of at least four sides of the cell stack.

It is yet a further object of the invention to provide a compression casing which provides for substantially gas tight separation of two opposite sides of the cell stack, in one embodiment being separation of the oxidation gas inlet and the oxidation gas outlet side of the cell stack.

A further object of the invention is to provide a compression casing assembly which provides for an even pressure distribution or a well defined pressure distribution throughout the area of the fuel or electrolysis cells in a cell stack.

A further object of the invention is to provide a compression casing assembly which thermally insulates a cell stack.

A further object of the invention is to provide a compression casing assembly which provides vibration damping and protection of a cell stack.

A further object of the invention is to provide a compression casing assembly which consists of few and stable components.

A further object of the invention is to provide a robust, durable and weldable compression casing assembly which protects the fuel cells and provides easy handling and mounting since the compression system and manifolds are integrated in the assembly.

A further object of the invention is to provide a compression casing assembly which enables easy, tight and durable serial and parallel cathode flow connection of two or more stacks.

A further object of the invention is to provide a compression casing assembly which inherently allows for simple connections for surplus injection of process gases or fluids.

These and other objects are achieved by the invention as described below.

Accordingly, a compression casing assembly is provided for stacks of especially solid oxide fuel cells or solid oxide electrolysis cells, but also potentially to other known cell types as already mentioned. In the following, the fuel cell stack or electrolysis cell stack will be regarded as a black box, since the essence of the present invention is the compression casing assembly, not the electro chemical reactions taking place within the cells. Hence, in case of fuel cells, the black box generates electricity and heat when supplied with oxidation gas and fuel gas or; In case of electrolysis cells, the black box generates oxidation gas and fuel gas when supplied with electricity, depending on the electrical load the black box either produces heat or consumes heat. The function and internal components of the fuel or electrolysis cell stack is considered known art and is not the subject of this invention.

Fuel or electrolysis cell stacks can have many physical shapes, not limiting the present invention but for the reason of simplifying the disclosure of the invention, the following explanation and examples will take as a starting point a cell stack with box shape i.e. with six rectangular sides, eight corners and twelve edges placed in substantially rectangular connection three by three. In the following, the cell stack will be characterised as having a top face, a bottom face and a plurality of side faces. The precondition of the present invention is accordingly that at least the top face and the bottom face need a compression force such that the top face is pressed towards the bottom face. Optionally, further two opposing side faces of the stack need a compression force against each other and in some cases further two opposing side faces need a compression force against each other.

To distribute a compression force and optionally also to provide thermally insulation, a rigid force distribution member with one planar and one convex shape is placed against the top face and one is placed against the bottom face of the stack. Optionally, also two or more of the side faces can be applied with force distribution members. Around the assembly of stack and force distribution members a flexible compression force mat is applied, which has the characteristics that it can be compressed when subjected to a compression force. The distance of the compression is related to the size of the compression force, thus the necessary compression force which shall be applied to the force distribution members and further to the stack can be achieved by compressing the mat the corresponding distance. The compression of the mat is maintained by applying a rigid fixing collar around the assembly of stack, force distribution members and compression force mat. In this context "rigid" means rigid against a pulling force, hence a thin metal sheet can be sufficiently rigid against a pulling force to apply the necessary fix. The fixing collar is tightened around the compression mat until the required compression distance or correlating compression force is reached, thereafter the collar is fixed in this tightened position. The fixing collar can comprise one or more sections which are all fixed.

1. Compression casing assembly for at least one cell stack made of a plurality of fuel cells or electrolysis cells, the at least one cell stack comprising
    a top face
    a bottom face
    a plurality of side faces
    fuel gas inlet and outlet suited for communication to fuel gas inlet and outlet manifolds
    oxidant gas inlet and outlet suited for communication to oxidant gas inlet and outlet manifolds
said compression casing assembly comprising at least one rigid force distribution member, at least one flexible compression force mat and at least one rigid fixing collar comprising an inside surface, an outside surface and a first and a second side edge, the at least one force distribution member comprising
    a top part having a first planar surface facing the top face of the cell stack and a primarily convex shaped second surface opposite said first planar surface facing in a direction towards the inside surface of the fixing collar
    a bottom part having a first planar surface facing the bottom face of the cell stack and a primarily convex shaped second surface opposite said first planar surface facing in a direction towards the inside surface of the fixing collar
    wherein said rigid fixing collar surrounds the at least one cell stack, the at least one force distribution member and the at least one flexible compression force mat on at least said top face, said bottom face and two of said side faces, the rigid fixing collar is pre tightened, whereby compression forces perpendicular to the surrounding rigid fixing collar is transmitted by means of the at least one flexible compression force mat and the at least one force distribution member to the at least one cell stack in directions primarily perpendicular to said top face, said bottom face and said two side faces and whereby the primarily convex shaped second surface of said top and bottom parts of the at least one force distribution member provides an evenly distributed surface pressure on at least the top face and the bottom face of the at least one cell stack.

2. A compression casing assembly according to feature 1, wherein said at least one force distribution member and said at least one compression force mat forms a substantially gas tight sealing between said top, bottom and two side faces of the at least one cell stack and the inside surface of said surrounding rigid fixing collar in at least a part of the axial extent of the collar.

3. A compression casing assembly according to feature 2, wherein a first end plate is fixed to said collar in the proximity of said first side edge and a second end plate is fixed to said collar in the proximity of said second side edge, whereby the collar and the first and second end plates forms a gas tight pressure resistant container.

4. A compression casing assembly according to feature 3, wherein the volume encapsulated by said first end plate in combination with a first edge zone of the collar forms a first gas side manifold and is provided with a first gas opening and said second end plate in combination with a second edge zone of the collar forms a second gas side manifold and is provided with a second gas opening for the at least one cell stack.

5. A compression casing assembly according to feature 3, wherein said first end plate is provided with a first gas opening and forms a first gas side manifold and said second end plate is provided with a second gas opening and forms a second gas side manifold for the at least one cell stack.

6. A compression casing assembly according to any of the preceding features, wherein said collar is made of a thin metal sheet, preferably ferritic or austenitic stainless steel or a nickel alloy, preferably inconel.

7. A compression casing assembly according to any of the preceding features, wherein said end plates are fixed to said collar by means of welding, a thread connection, a clamp connection, rivets, beading, glue or a flange connection.

8. A compression casing assembly according to any of the preceding features, wherein two or more of said cell stacks are placed side by side and/or bottom face towards top face in a matrix pattern.

9. A compression casing assembly according to any of the preceding features, wherein two or more of said assemblies are connected in series by connecting said second side edge of a prior assembly to a first side edge of a subsequent assembly.

10. A compression casing assembly according to feature 9, wherein openings in the connected edge zones in between the series connected assemblies are provided for the inflow of purge gas, fuel and/or cooling media.

11. A compression casing assembly according to any of the preceding features, wherein said at least one force distribution member is thermally insulating and made of ceramic, glass, metal or a combination of these, preferably porous calcium silicate or glass fibre reinforced calcium silicate.

12. A compression casing assembly according to any of the preceding features, wherein said at least one flexible compression force mat is made of vibration damping material.

13. A compression casing assembly according to any of the preceding features, wherein said at least one flexible compression force mat material comprise refractory ceramic fibre or glass fibre, preferably magnesia-silica fibre, alumina fibre containing an amount of silica, low alkali aluminosilicate compositions containing one or more of the following oxides: zirconia, chromia or titania or vermiculite.

14. A compression casing assembly according to any of the preceding features wherein said assembly has force distribution members applied to the top face, the bottom face and two side faces of the stack and has a primarily circular cross section or said assembly has force distribution members applied to the top face and the bottom face of the stack and has a primarily oval, elliptic or racetrack cross section.

15. A process for manufacturing at least one assembly according to any of the features 1-14 comprising the steps of
providing at least one cell stack comprising a plurality of fuel cells or electrolysis cells
providing at least one rigid force distribution member and at least one flexible compression force mat
surrounding said stack, force distribution members and force mat with a rigid fixing collar on at least the top face, the bottom face and two side faces of the stack
tightening said collar to compress said mat and thereby apply a compression force to the stack
fixing said collar in the tightened state.

16. A process according to feature 15 further comprising the steps of
providing a first and a second end plate
fixing said first end plate to the collar in the proximity of a first side edge of the collar and fixing said second end plate to the collar in the proximity of a second side edge of the collar.

17. A process according to feature 15 further comprising the steps of
providing two or more of said assemblies
series connecting the assemblies by fixing a second side edge of a prior assembly to a first side edge of a subsequent assembly.

18. Use of a compression casing assembly according to any of the features 1-14 for vibration damping and protection of at least one fuel cell stack or electrolysis cell stack.

The invention is further illustrated by the accompanying drawings showing examples of embodiments of the invention.

POSITION NUMBER OVERVIEW

101, 201, 301, 401,
501, 601, 701, 801: Rigid fixing collar.
102, 202, 302, 702, 802: Top rigid force distribution member.
103, 203, 303, 703, 803: Bottom rigid force distribution member.
104, 804: First side rigid force distribution member.
105, 805: Second side rigid force distribution member.
106, 206, 306, 706, 806: Flexible compression force mat.
109, 209, 309, 709, 809: Cell stack, box shaped.
210, 410, 510, 610, 710: Oxidation gas inlet manifold.
211, 411, 511, 611, 711: Oxidation gas inlet pipe.
212, 712, 812: Oxidation gas outlet manifold.
213, 413, 513, 613, 713: Oxidation gas outlet pipe.
421, 521, 621: Fuel gas inlet pipe.
422, 522, 622: Fuel gas outlet pipe.
731: Intermediate oxidation gas manifold.

Figure 1:
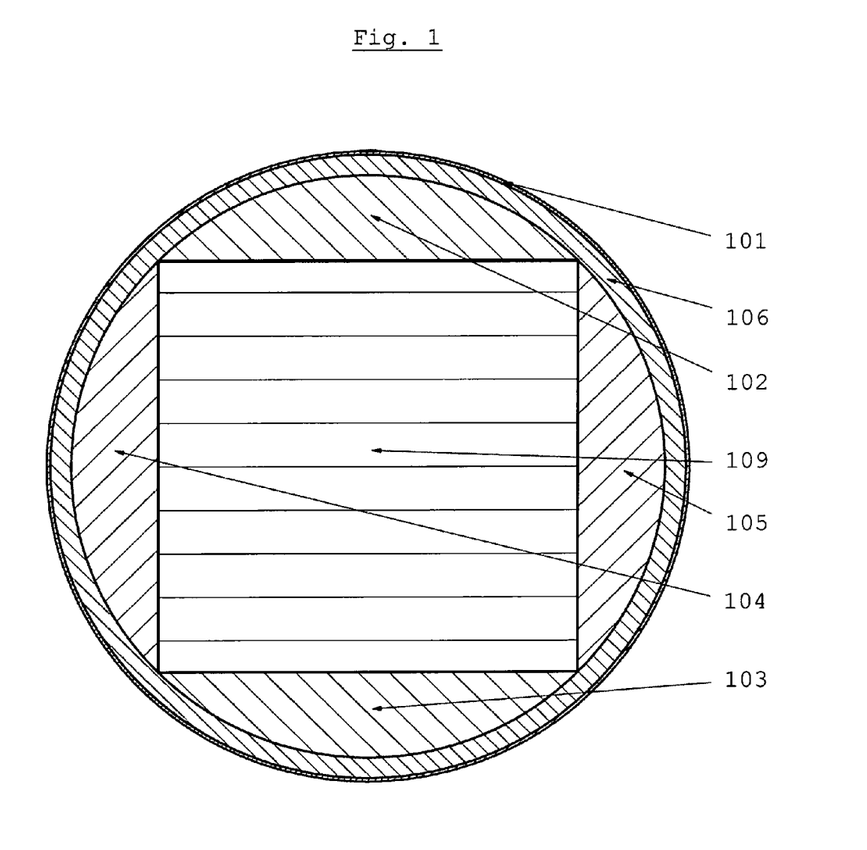
FIG. 1 shows a cut end view of the compression casing assembly including the encased cell stack according to an embodiment of the invention.

Referring to FIG. 1, in one embodiment the cell stack 109 to be compressed is box-shaped and it is a combined internal and external manifolded cell stack. The fuel gas is supplied to and removed from the cells via internal manifolds connected to fuel pipes (not shown). The oxidation gas is supplied to one edge of the cells (fuel cells or electrolysis cells as explained earlier), streams past the cell areas and is then removed from the other edge of the cells. When the cells are stacked these parallel edges form two sides of the stack which then have to be connected to two external manifolds. In FIG. 1, the box shaped cell stack 109 is seen from the oxidation gas inlet side. In this embodiment rigid and thermally insulating force distribution members 102, 103, 104, 105 are applied to the four sides of the cell stack: the top and bottom side, plus the two sides without openings for oxidation gas.

As seen In FIG. 1, each of the four force distribution members are planar on the surface which has contact to the cell stack, whereas the opposing surface of each of the force distribution members has a convex shape in one dimension and a linear shape in the dimension parallel to the axis of the convex curve. The convex curve of the force distribution members in this embodiment has the shape of a circular arc, more specifically an arc which is a quarter of a circle. Hence, when the four force distribution members each are placed on their corresponding side of the stack, the four convex shaped surfaces together forms a cylindrical shape substantially without any voids between the force distribution members and the stack. The force distribution members can be made of a wide range of materials depending of the specific needs (thermal insulation, gas inpermeability, rigidity, additional functions) of the application. Examples of materials for force distribution members are: ceramic, glass, metal or a combination of these, porous calcium silicate or glass fibre reinforced calcium silicate. In some applications thermal insulation is a desired characteristic of the force distribution members, whereas in other applications thermal insulation is not necessarily wanted. The force distribution members can even be active components such as anode heat exchangers.

A flexible compression mat is placed around the assembly of the cell stack and the four force distribution members. The flexible compression mat encircles the assembly tightly and the ends of the mat is fitted tightly against each other for instance as a butt end fixing or a tongue and groove assembly. The compression mat has characteristics which are very well suited for compression of the SOFC under high temperature conditions. It is substantially gas tight, it is temperature resistant and it is compressible such that the longer distance it is compressed, the more compression force it exerts against the compression direction. The compression mat obviates the need for metallic compression springs because it exerts a compression force to the cell stack when it has been compressed a suitable distance. This "suitable distance" can be determined either by a known resilience module for the compression mat or simply by experimental iterations. The precondition is the stacks need for compression, which is determined experimentally and which is specific for the type of cell stack in question. The stack compression force is obtained by tightening the compression mat around the stack with the wanted force. Another method to determine the suitable compression distance of the compression mat is to apply force measurement devices between the stack box surfaces and the force distribution members and then compress the surrounding mat until the desired compression force on the stack is obtained according to the force measurement devices. Once this experiment has been performed, further compression assemblies can be produced on the basis of this data with compression mats of similar characteristics. The necessary characteristics for the compression mat can be obtained with a range of materials known to the man skilled in the art, of which some are: refractory ceramic fibre or glass fibre, magnesia-silica fibre, alumina fibre containing an amount of silica, low alkali aluminosilicate compositions containing one or more of the following oxides: zirconia, chromia or titania or vermiculite.

The compression casing assembly is completed with a rigid fixing collar that surrounds the stack, force distribution members and the compression mat. The fixing collar serves several purposes, most important it fixes the compression mat in the desired compressed state which is necessary to provide the necessary compression force to the stack. The fixing collar can be made of a range of materials such as metals, plastics, composite materials, glass fibres, carbon fibres or other suitable materials known to the skilled person. If for instance the fixing collar is made of steel, it can be applied around the assembly as a thin sheet, tightened to the desired compression force by hose clamps or the like. When the desired dimension is reached, the sheet can be welded along its edge, thereby forming a tight fixed cylindrical collar around the compression mat, force distribution members and the stack. The fixing collar further serves as protection of the cell stack. When the stack is canned as described, it is thermally protected, protected against shocks and vibrations by the flexible compression mat and well protected against bruises, scratches the like by the collar.

The collar can further serve the purpose as a part of the oxidation gas inlet and outlet manifold. When fitted with narrow tolerances, the cell stack, the force distribution members, the compression mat and the fixing collar forms a substantially gas tight barrier between the oxidation gas inlet side of the stack and the oxidation gas outlet side of the stack. Even if a minor amount of oxidation gas manages to pass through the compression assembly from the inlet side to the outlet side, this will only have inferior effect on the cell stack performance.

Figure 2:
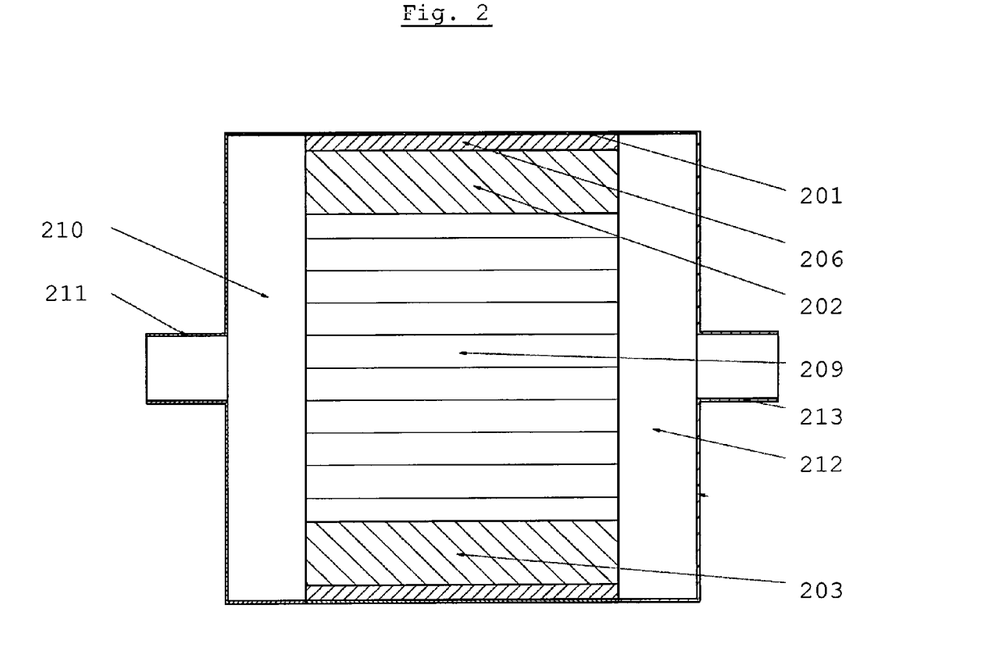
FIG. 2 shows a cut side view of the compression casing assembly including the encased cell stack according to an embodiment of the invention.

Referring to FIG. 2 it can be seen that if the fixing collar has a greater dimension, is broader, than the fuel cell stack 206 (or electrolysis cell stack) and its surrounding force distribution members 202, 203 and compression mat 206, the assembly is provided with an enclosing rim on both the oxidation gas inlet side and the oxidation gas outlet side. When this rim is provided with a cap, a very simple inlet manifold 210 and outlet manifold 212 is achieved. The cap can be made in the same steel material as the fixing collar and the two can be welded together which gives a gas tight and very robust manifold when compared to known art external manifolds which needs to be fitted by individual seals and mounting systems. Hence, the compression casing assembly is formed as a pressure container which can be easily dimensioned to withstand substantial over-pressure as is found in for instance turbine systems. A huge advantage is further that running the fuel cell stack by such elevated pressure increases the Nernst potential which increases the electrical efficiency of fuel cell stack considerably. The oxidation gas is provided to the inlet manifold via an oxidation gas inlet pipe 211 and extracted from the outlet manifold via an oxidation gas outlet pipe 213. The fuel gas is provided and extracted from the stack via internal manifolds known in the art (not shown) and fuel inlet and outlet pipes (not shown) is provided to the internal manifolds in the stack through openings through the fixing collar, the compression mat and further through the force distribution members (not shown). The fuel gas pipes can be sealed to the fixing collar and the compression mat and force distribution members by known techniques and materials such as welding, brazing and the like.

In a further embodiment, not shown, the compression casing assembly including one or more stacks can be robust and easily fitted with a side manifold even if the collar is not broader than the stack, force distribution members and compression mat assembly. If the collar has substantially the same with as the rest of said assembly, still an end plate can be easily fitted to the collar by any suitable technique. If the end plate is given a slightly convex shape, a manifold volume will be formed for distributing the oxidation gas between the cells and the end plate can in the case where metal is used simply be welded, riveted, brazed or beaded to the collar analogue to the solution according to FIG. 2 and thus form a gas tight, pressure resistant and very robust assembly.

The compression casing assembly according to FIG. 2 thus forms a simple, gas tight, stable and robust cell stack unit.

Figure 7:
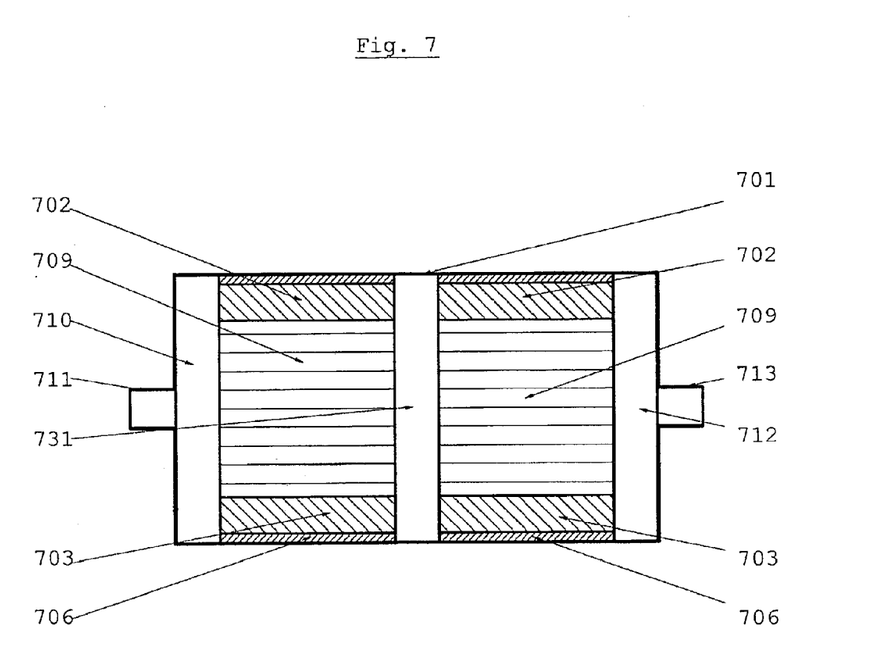
FIG. 7 shows a cut side view of the compression casing assembly with two stacks connected is serial cathode flow by an edge to edge connection of the two fixing collars.

To increase fuel cell efficiency, it can be advantageous to connect the stacks in series. As shown In FIG. 7, the present assembly is very well suited for this purpose as an outlet manifold 712 of the primary stacks 709 and a following inlet manifold 710 of said stacks 709 can be omitted and the two fixing collars are then simply welded together.

In this way a volume, an intermediate manifold 731 arises between the two serial connected stacks if the surrounding fixing collar 701 is broader than the stack. Pipes can be connected to the intermediate manifold, enabling the injection of supplementary oxidation gas, steam, water mist or other process gases or fluids. Again the present compression casing assembly provides a sturdy and simple unit which enables simple, robust, pressure resistant and gas tight serial connection of a number of fuel cell stacks.

Figure 8:
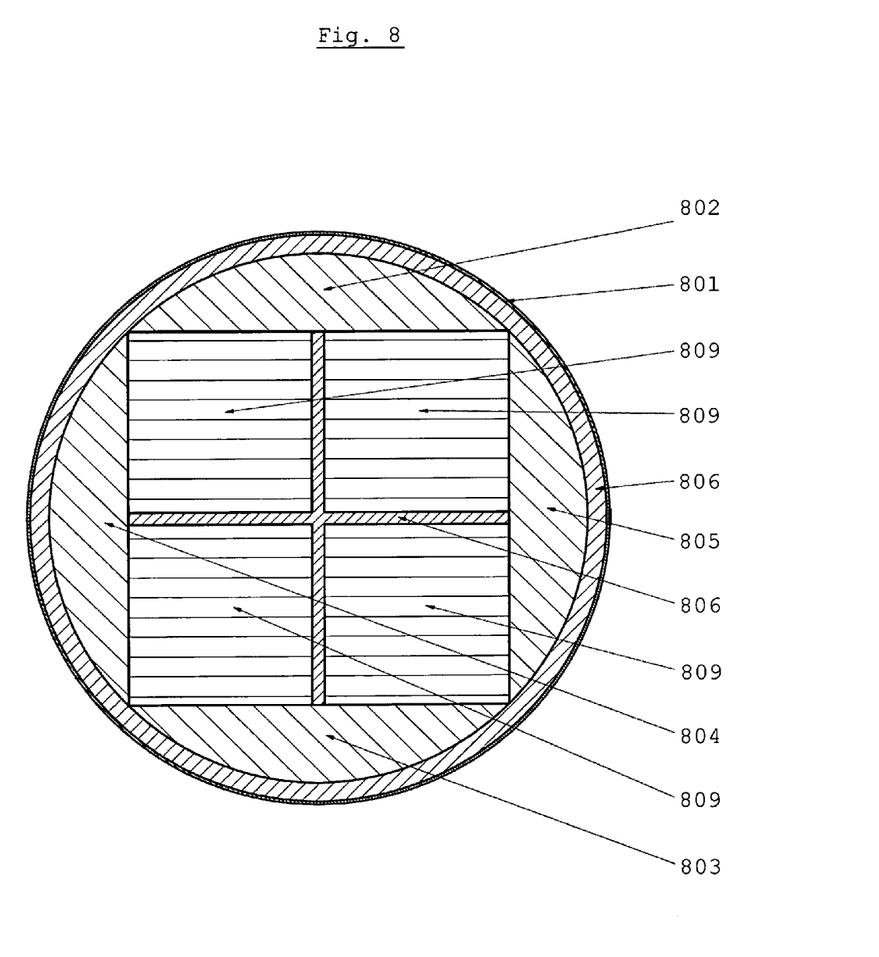
FIG. 8 shows a cut end view of the compression casing assembly with four stacks connected in parallel cathode flow.

As seen In FIG. 8, a parallel connection of fuel cell stacks or electrolysis cell stacks is also achievable according to the present invention. Two or more stacks 809 can be placed above each other or side by side. No matter which or how many stacks are placed in parallel, force distribution members 802, 803, 804, 805 can be fitted around the stacks, and compression mats 806 can be placed between the stacks to fill out voids and even out irregularities. In this way even when two or more stacks are placed in parallel, a simple, sturdy, pressure resistant and gas tight compression casing assembly can be achieved.

Figure 3:
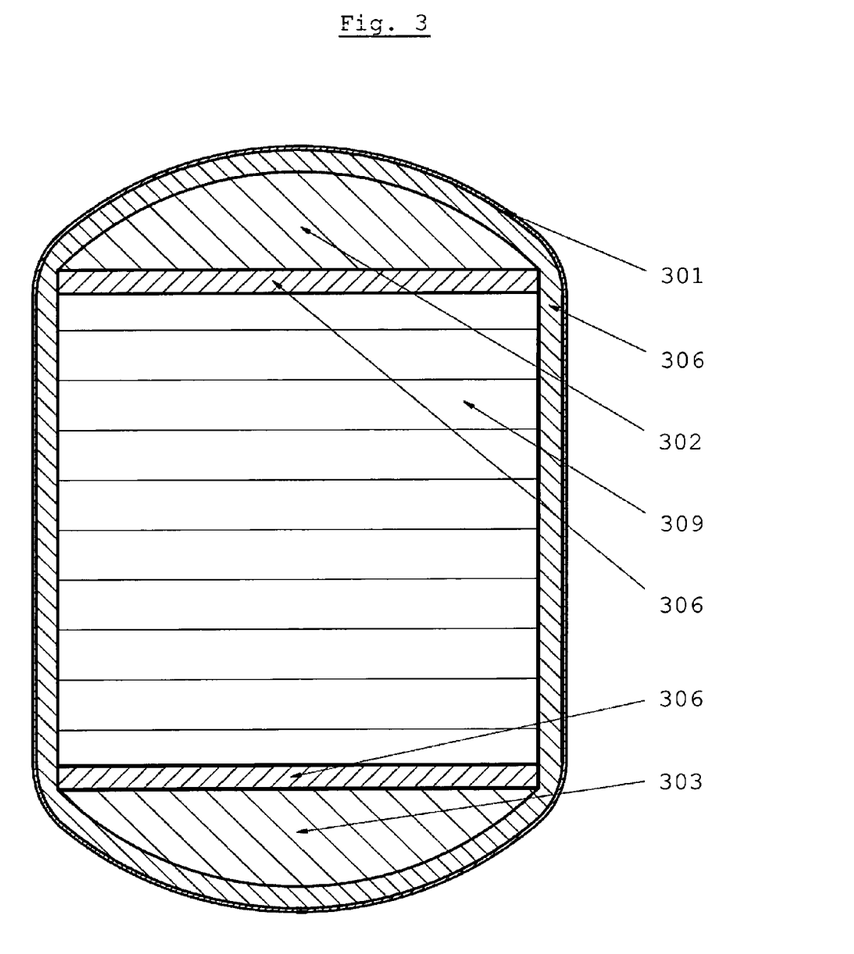
FIG. 3 shows a cut end view of the compression casing assembly including the encased cell stack according to another embodiment of the invention.

Referring to FIG. 3 an embodiment is shown where only the top and the bottom of the cell stack 309 is applied with force distribution members 302, 303. The sides of the stack are only applied with a compression mat 306, not with the objective to compress, but merely to achieve a gas tight enclosure of the stack. This embodiment exploits the fact that the cell stack mainly needs compression of the top against the bottom end, whereas the side compression is of less importance for the durability and effectiveness of the stack. Therefore, this embodiment saves not only the side force distribution members but also a considerable amount of space.

Figure 4:
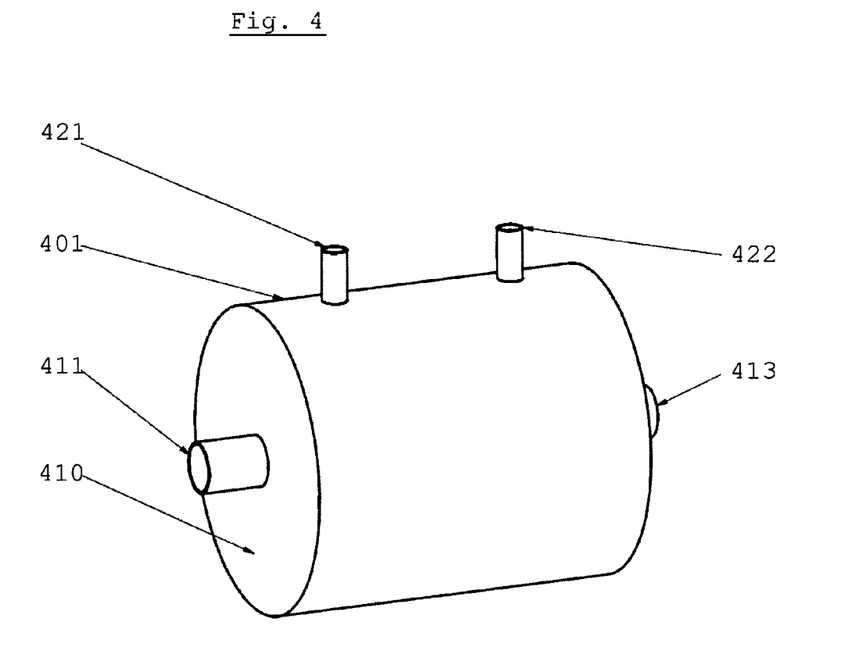
FIG. 4 shows an isometric view of the compression casing assembly fitted with endplates as gas manifolds, radially extending fuel gas pipes and axial extending oxidation gas pipes.
Figure 5:
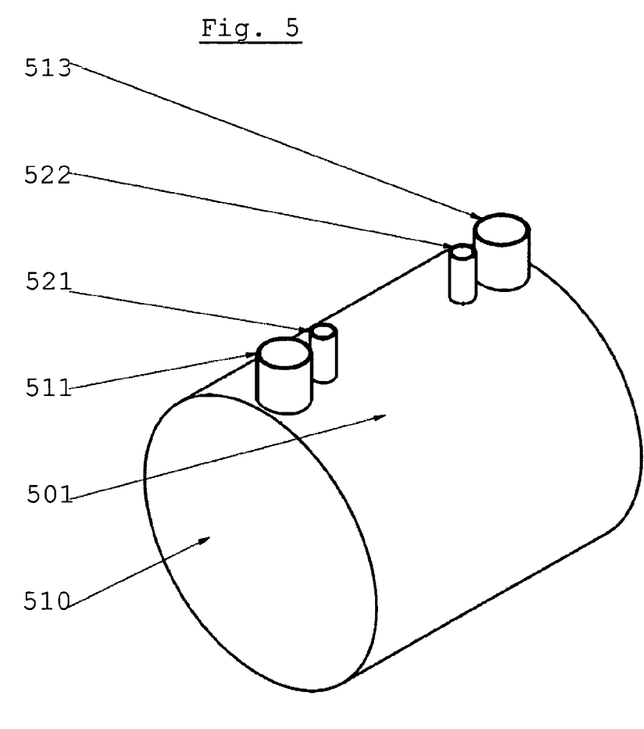
FIG. 5 shows an isometric view of the compression casing assembly fitted with endplates as gas manifolds, radially extending fuel gas pipes and radially extending oxidation gas pipes.
Figure 6:
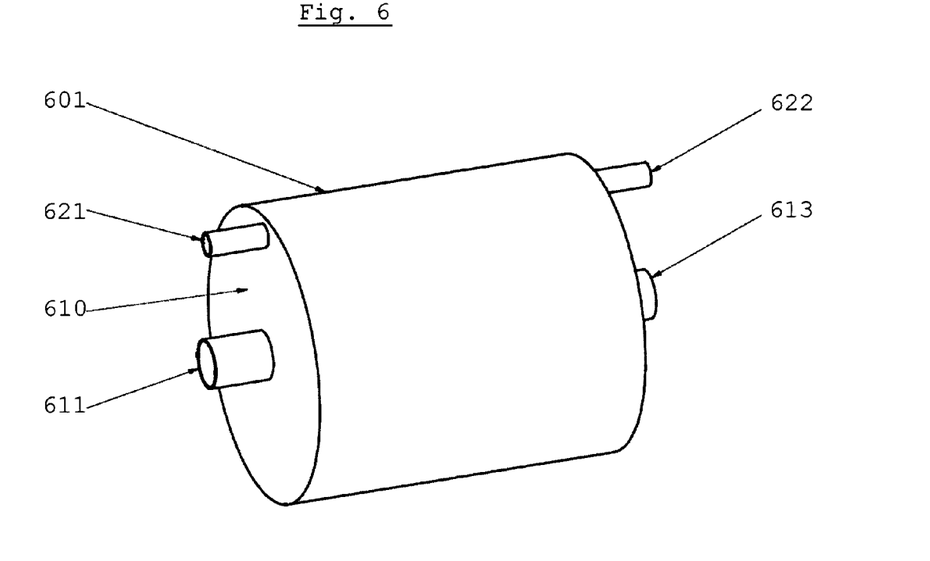
FIG. 6 shows an isometric view of the compression casing assembly fitted with endplates as gas manifolds, axially extending fuel gas pipes and axially extending oxidation gas pipes.

FIGS. 4, 5 and 6 shows how fuel inlet 421, 521, 621 and outlet pipes 422, 522, 622 can be connected to the canned fuel cell stack or electrolysis cell stack. The pipes extend through the collar 401, 501, 601 and further on through the compression force mat and the force distribution members (not visible In FIGS. 4, 5 and 6 and onto the internal manifolding of the cell stack. In an embodiment the pipes can be made in a material, for instance steel, which can be welded or brazed to the collar so that a robust and gas tight assembly of the cell is obtained. Where FIG. 4 is analogue to the embodiments according to FIG. 1 and FIG. 2, a different solution is shown In FIG. 5, where also the oxidation gas pipes 511, 513 are mounted on the collar cylinder side such that they extend substantially orthogonal to the cylinder central axis. This embodiment can be advantageous in applications where piping is desired on only one side of the cell assembly. In FIG. 6, an embodiment is shown where both oxidation gas 611, 613 and fuel gas 621, 622 pipes extend substantially parallel to the cylinder axis via the oxidation gas manifolds.

The invention claimed is:

1. Compression casing assembly for at least one cell stack made of a plurality of fuel cells or electrolysis cells, the at least one cell stack comprising:
   a top face;
   a bottom face;
   a plurality of side faces;
   fuel gas inlet and outlet suited for communication to fuel gas inlet and outlet manifolds; and
   oxidant gas inlet and outlet suited for communication to oxidant gas inlet and outlet manifolds,
said compression casing assembly comprising at least one rigid force distribution member, at least one flexible compression force mat and a single rigid fixing collar comprising an inside surface, an outside surface and a first and a second side edge, the at least one rigid force distribution member comprising:

a top part having a first planar surface facing the top face of the cell stack and a primarily convex shaped second surface opposite said first planar surface facing in a direction towards the inside surface of the fixing collar; and a bottom part having a first planar surface facing the bottom face of the cell stack and a primarily convex shaped second surface opposite said first planar surface facing in a direction towards the inside surface of the fixing collar;

wherein said single rigid fixing collar completely surrounds the at least one cell stack, the at least one force distribution member and the at least one flexible compression force mat on at least said top face, said bottom face and two of said plurality of side faces, and wherein the rigid fixing collar is pre tightened, whereby compression forces perpendicular to the surrounding rigid fixing collar is transmitted by means of the at least one flexible compression force mat and the at least one force distribution member to the at least one cell stack in directions primarily perpendicular to said top face, said bottom face and said two of said plurality of side faces and whereby the primarily convex shaped second surface of said top and bottom parts of the at least one force distribution member provides an evenly distributed surface pressure on at least the top face and the bottom face of the at least one cell stack.

2. A compression casing assembly according to claim 1, wherein said at least one force distribution member and said at least one compression force mat forms a substantially gas tight sealing between said top, bottom and two side faces of the at least one cell stack and the inside surface of said surrounding rigid fixing collar in at least a part of the axial extent of the collar.

3. A compression casing assembly according to claim 1, further comprising a first gas side manifold provided with a first gas opening and a second gas side manifold provided with a second gas opening for the at least one cell stack.

4. A compression casing assembly according to claim 1, wherein said collar is made of ferritic or austenitic stainless steel or a nickel alloy.

5. A compression casing assembly according to claim 1, wherein end plates are fixed to said collar by means of welding, a thread connection, a clamp connection, rivets, beading, glue or a flange connection.

6. A compression casing assembly according to claim 1, wherein two or more of said cell stacks are placed side by side and/or bottom face towards top face in a matrix pattern.

7. A compression casing assembly according to claim 1, wherein two or more of said assemblies are connected in series by connecting a second side edge of a prior assembly to a first side edge of a subsequent assembly.

8. A compression casing assembly according to claim 7, wherein openings in the connected edge zones in between the series connected assemblies are provided for the inflow of purge gas, fuel and/or cooling media.

9. A compression casing assembly according to claim 1, wherein said at least one force distribution member is thermally insulating and made of ceramic, glass, metal or a combination of these.

10. A compression casing assembly according to claim 1, wherein said at least one flexible compression force mat is made of vibration damping material.

11. A compression casing assembly according to claim 1, wherein said at least one flexible compression force mat material comprise refractory ceramic fibre or glass fibre.

12. A compression casing assembly according to claim 1, wherein said assembly has force distribution members applied to the top face, the bottom face and two side faces of the stack and has a primarily circular cross section or said assembly has force distribution members applied to the top face and the bottom face of the stack and has a primarily oval, elliptic or racetrack cross section.

13. A process for manufacturing at least one assembly according to claim 1 comprising the steps of:
   providing at least one cell stack comprising a plurality of fuel cells or electrolysis cells;
   providing at least one rigid force distribution member and at least one flexible compression force mat;
   completely surrounding said stack, force distribution members and force mat with a rigid fixing collar on at least the top face, the bottom face and two side faces of the stack;
   tightening said collar to compress said mat and thereby apply a compression force to the stack; and
   fixing said collar in the tightened state.

14. A process according to claim 13 further comprising the steps of:
   providing a first and a second end plate; and
   fixing said first end plate to the collar in the proximity of a first side edge of the collar and fixing said second end plate to the collar in the proximity of a second side edge of the collar.

15. A process according to claim 13 further comprising the steps of:
   providing two or more of said assemblies; and
   series connecting the assemblies by fixing a second side edge of a prior assembly to a first side edge of a subsequent assembly.

16. A method of damping vibrations and protecting at least one filed cell stack or electrolysis cell stack, the method comprising the step of utilizing a compression casing assembly according to claim 1 for vibration damping and protection of at least one fuel cell stack or electrolysis cell stack.

* * * * *